March 6, 1956 F. M. MORA 2,737,482
RECTIFYING TOWER FOR RECTIFYING CRUDE
GASEOUS ACETONE AND OTHER FLUIDS
Filed Aug. 12, 1952
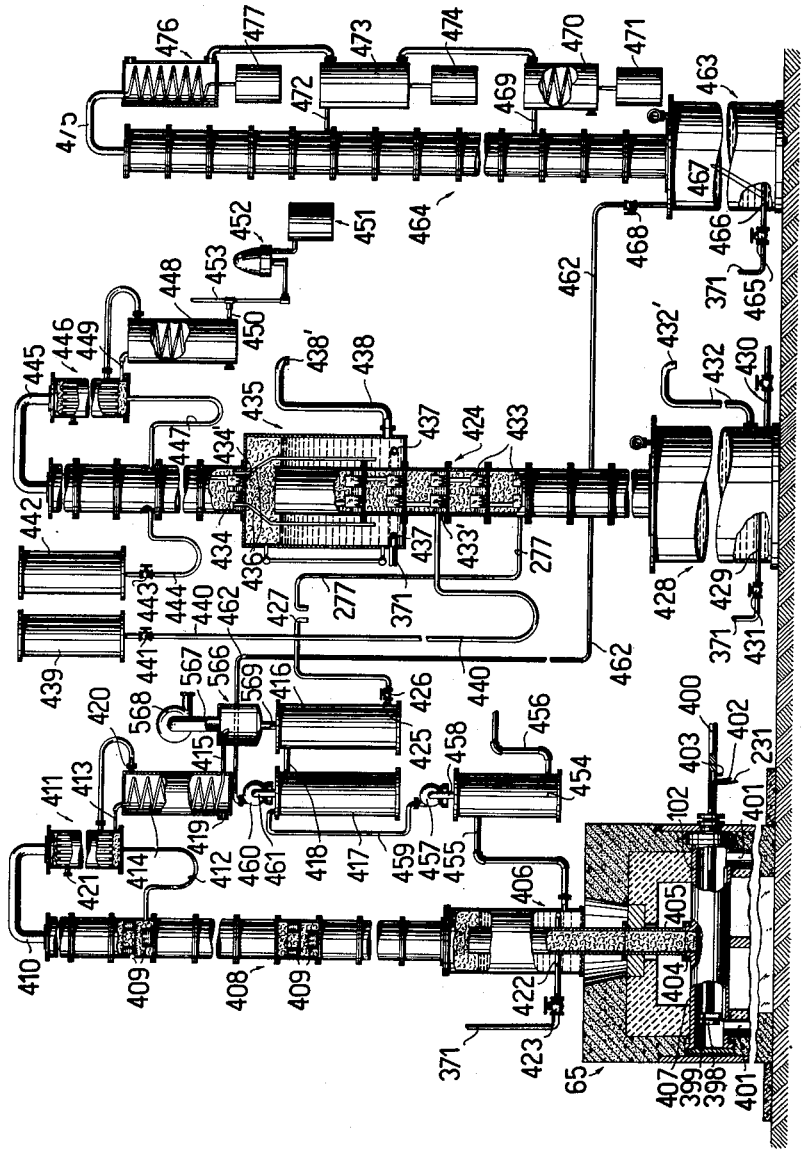
INVENTOR,
Fernando Mario Mora
BY
Attorney

United States Patent Office 2,737,482
Patented Mar. 6, 1956

2,737,482

RECTIFYING TOWER FOR RECTIFYING CRUDE GASEOUS ACETONE AND OTHER FLUIDS

Fernando Mario Mora, Buenos Aires, Argentina

Application August 12, 1952, Serial No. 304,022

6 Claims. (Cl. 202—154)

The present invention relates to apparatus for the rectification of crude acetone and other fluids and provides a novel rectifier tower possessing considerable advantage. The invention has particular reference to the simultaneous rectification and treatment of acetone produced by the decomposition of calcium acetate liquor in accordance with my copending application Ser. No. 304,023 filed August 12, 1952.

An object of the invention is the provision of a single rectifying tower in which the fluid being rectified is subjected in separate zones to the action of different treating materials.

Another object of the invention is the provision of an acetone rectifying tower which reduces the cost of construction as well as the space required for its utilization.

A further object of the invention is the provision of a single acetone rectifying tower in which both alkaline and acid reactions are performed.

Other and further objects of the invention will become apparent from the description which follows taken in conjunction with the accompanying drawing in which:

The figure is a side elevation, partly in section, of the acetone and by-products producing equipment starting from calcium acetate liquor and showing a rectifying tower constructed in accordance with the invention.

Referring to the figure, calcium acetate liquor is pumped through a flexible duct 231 leading to the atomizing head 398 of a piston 399 mounted on a stem 400. The stem 400 with the atomizing head 398 thereon is slidably arranged in the calcium acetate decomposition cylinder 102 which is heated by hot gases produced in a furnace 65, the cylinder 102 being provided at each of its ends with sinks 401 for reception of solid residue.

A pipe 402 delivers the cooling liquid and a pipe 403 allows discharge of the heated cooling liquid. The cooling or refrigerating liquid is necessary in order to prevent the calcium acetate, which enters into stem 400, from forming incrustations on the internal walls of the duct which is the continuation of the flexible duct, which incrustation would finally block said duct.

The refrigerating liquid is water supplied by a source (not shown) and enters the stem as stated, through pipe 402 and leaves the former through pipe 403. The warm water is sent to a boiler (not shown) provided with its corresponding furnace and accessories for generating the necessary steam required in the several parts of the plant, as has already been seen and will be further seen later on, which steam generating boiler is connected to the main supply steam pipe 371.

The calcium acetate decomposition cylinder 102 is provided at its upper middle part with an opening 404, to which an exit duct 405 extending into a dephlegmator 406, is provided. During the working stroke of piston 399, the atomizing head 398 projects a finally divided spray of calcium acetate liquor against the internal wall 407 of the calcium acetate decomposition cylinder 102. The finely divided spray forms a film on the internal wall 407, where the water is almost instantaneously evaporated and thereafter immediately the drying action of the paste starts, whereupon the dry paste decomposes, at which state the calcium acetate has reached a temperature exceeding 300° C.

Thus steam, acetone, methylacetone and acetone oil vapors are produced which leave the calcium acetate decomposition cylinder 102 through opening 404 and enter the dephlegmator 406. The residual ashes are discharged into sinks 401.

By "acetone oils" are to be understood a mixture of substances obtained as by-products of the purification of the crude acetone, said by-products being derived from the higher ketones produced during the treatment of the calcium acetate liquid which has been formed from the pyroligneous acid which contain about 5% of acids other than acetic acid (see "La Industria de la Destilación de Leña y sus Derivados," Juan A. Yantorno, Buenos Aires, 1933, pages 546 ff.; 559 ff.).

The dephlegmator 406 collects the heavy oils and part of the water. The remaining gases and vapors rise into the concentration tower 408, formed of a plurality of cascade containers 409.

The uncondensed vapors and gases, which is a crude mixture of acetone at 20 to 25%, leave the tower through duct 410 and enter condenser 411, the object of which is to concentrate them even more, whereby a great portion of the water is returned to the concentration tower 408 through a reflux pipe 412, whilst the uncondensed gaseous products having a higher concentration of acetone, are discharged through discharge pipe 413 and enter refrigerator 414, wherein crude acetone is obtained, having a concentration of approximately 25 to 30%. This solution is discharged through pipe 415 into a dephlegmator 566, the upper part of which is connected through pipe 567 to a suction fan 568 connected to atmosphere, whilst the lower part of said dephlegmator 566 is connected to a discharge pipe 569 which leads the liquid to a precipitating deposit 416 where the acetone oils are separated and float on the surface of the acetone, so that they may pass, when a certain level has been reached, to tank 417, through pipe 418. The suction fan 568 is provided in order to decrease the pressure in the cylinder 102, concentration tower 408 and its accessories, so as to assure that the decomposed portion of calcium acetate in cylinder 102 is immediately withdrawn, whereby to avoid further decomposition of the crude acetone, as this is not desirable for the purpose herein pursued.

Refrigerator 414 and condenser 411 are cooled with water supplied from the water supply source (not shown) which water enters through admission pipe 419 into separator or refrigerator 414 and leaves the upper part thereof through pipe 420 to enter condenser 411 and is finally discharged at the upper part through discharge pipe 421.

It has now to be pointed out, that in order to remove all the traces of acetone from the water and acetone oil, which flow back to the dephlegmator 406, the latter is provided with heating coil 422, supplied with steam from the supply pipe 371. A valve 423 enables the volume of steam entering coil 422 to be controlled.

The aqueous acetone solution which settles out in tank 416 is ready to enter the acetone rectifying tower 424. A discharge pipe 425 provided with a control valve 426 is arranged in the lower part of tank 416 and permits discharge of the crude acetone which continues on its path through pipe 427 and enters refrigerating duct 231. Once the crude acetone is heated, it is transported through a pipe 277 and enters the lower part of the acetone rectifying tower 424, in which the preheated crude acetone solution is subjected to a chemical treatment.

The acetone rectifying tower 424 comprises a bottom boiler 428 provided with a heating coil 429 which supplies steam through the main steam feeding pipe 371 said steam previously passing through valve 431. A discharge pipe 432 which at the same time forms a level device for the boiler due to the fact that its discharge opening 432' is arranged at a certain height with regard to the floor assures that the liquids which flow downwardly in column 433 and enter into boiler 428, stay a considerable time in the boiler 428, the reason for which will be explained later on.

The acetone rectifying tower 424 is provided with a lower bubble tray section 433 and an upper bubble tray section 434. The upper section 434 is separated from the lower section of bubble trays 433 by an intermediate boiler 435 into which enter the upper part of the lower section of bubble trays 433.

A plurality of downcomers 436 connects the bottom section 434' of the upper section of bubbles containers 434 with the lower part of the boiler 435, which downcomers 436 are adapted to discharge, the liquid portions of the upper section of bubble containers 434 into said lower part of said boiler 435. A heating coil 437 is arranged in the bottom part of boiler 435 and is supplied with steam by the main steam feeding pipe 371. A discharge pipe 438 having a discharge opening 438' maintains the liquid level in the boiler 435 at a considerable height in a similar way as discharge opening 432' does with the liquid contained in boiler 428, whereby the liquid residues formed in boiler 435 may be discharged.

As has already been stated the crude preheated acetone enters through pipe 277 into the lower section of bubble containers 433 where the liquid portions will fall towards the boiler 428 and the gaseous products will rise in said tower 424. The heating coil 429 which is connected to the main steam feeding pipe 371 is provided with a discharge pipe 430 having a valve, and enables the temperature of the liquid portion housed in the boiler 428 to be raised, whereby the acetone vapors will be separated from said liquid and will rise in the tower 424 bubbling through the lower bubble container 433 whereby the vapors increase each time their content of acetone. These vapors will thus reach the containers 433' where they are treated with a treating material such as alkaline solutions supplied by auxiliary tank 439 and its supply pipe 440. A control valve 441 enables graduation of the volume of the alkaline solution, which may be for instance sodium carbonate, sodium hydrate or calcium hydrate. This alkaline solution (or solutions) is added in order to precipitate the remainder of the oils and neutralize the possible entrainments of phenols which are produced by remainders of tar which may have been present in the calcium acetate liquor.

The thus purified acetone vapors rise and bubble in the following bubble trays until they finally reach the boiler 435 to pass thereafter into the upper bubble tray section 434.

In this upper section 434 the vapors bubble in the liquid part containing in solution a corrective agent such as mineral acids supplied by auxiliary tank 442 through valve 443 and pipe 444. The mineral acids are necessary for eliminating the amine portions and other impurities which the acetone vapors may still contain.

Thus the pure acetone vapors leave the upper part of tower 424 through pipe 445 and enter condenser 446 which returns to the acetone rectifying tower 424 through pipe 447 the liquid parts which may have been entrained, whilst the acetone vapors are led into refrigerator 448 through duct 449 and in the refrigerator 448 said acetone vapors are liquefied. The liquid acetone leaves said refrigerator 448 through discharge pipe 450 and enters storage tank 451 (only schematically illustrated) previously passing through a test tube 452 provided with a breather pipe 453.

The cooling system of the condenser 446 and the refrigerator 448 is exactly the same as that of condenser 411 and refrigerator 414 and therefore it will not be specifically described.

Meantime the liquid portion which enters boiler 435 through discharge duct 436 and which still contains acetone in solution, is retained a considerable time in said boiler 435 in order to remove any last traces of acetone which said liquid may contain to which effect the heating coil 437 is provided.

From the above explanation in connection with the acetone rectifying tower 424 it may be understood that in view of the double arrangement of boilers and accessories, loss of heat is considerably reduced as compared with known types of rectifying towers which use at least two independent columns, one for the alkaline treatment and the other for the acid treatment.

Furthermore this novel tower 424 also enables the total height thereof to be reduced in comparison with the sum of the heights of the known independent towers which also signifies a reduction in the number of bubble trays.

In view of the foregoing statements it can also be understood that the rectifying tower 424 or its structural equivalent can be employed in connection with any other type of distilling process, wherein the fluid to be rectified must be subjected to two different treatments such as the acid and alkaline treatments above described. Obviously if the bubble trays have to be replaced by any other type of gas-liquid contact equipment, such as cascade containers, this can easily be done. Therefore this invention intends to cover also this alternative.

The acetone oils part of which, as has already been described, is accumulated in the upper part of tank 417, are also accumulated in tank 454. The acetone oils which are collected in tank 454 are supplied by dephlegmator 406 through pipe 455 which operates according to the same principles of levels as discharge pipes 432 and 438. A discharge pipe 456 which also operates according to the same principle discharges the water contained in tank 454 which is run to waste. A pump 457 takes up from the upper part of tank 454 the acetone oils which float on the water in tank 454, by means of duct 458 and sends said acetone oils through duct 459 into tank 417.

A pump 460 provided with a suction duct 461 which enters tank 417 sends said acetone oils through supply duct 462 into boiler 463 of the acetone oil rectifying tower 464. This boiler 463 is provided with a heating coil 466 having steam discharge openings 467, which coil 466 is connected to the main steam feeding pipe 371 through valve 465.

The acetone oils which enter boiler 463 through valve 468 start to rise in gaseous form, in other words the acetone oil vapors and the water vapors pass through bubble trays (not shown), arranged in tower 464 where different products are separated at different heights; more particularly the heavy oils are collected in the lower part of tower 464 by pipe 469 passing through refrigerator 470 into storage tank 471. The medium oils are collected at a medium height of column 464 by means of pipe 472 passing refrigerator 473 and are stored in storage tank 474 and finally the light oils are collected in the upper part by duct 475 passing through refrigerator 476 and are stored in storage tank 477. All the storage tanks 471, 474 and 477 are schematically shown.

I claim:

1. In a rectifying tower, a bottom boiler having an upper end, a heating coil positioned in said bottom boiler and adapted to be connected to a source of supply of a heating medium, a discharge pipe connected with said boiler and providing a leveling device determining a liquid level in said bottom boiler below said upper end, said tower further including a lower section connected to said upper end and an upper section, said upper and lower sections being spaced apart and being arranged in superimposed relation with respect to each other, an intermediate boiler extending between said upper and lower sections and surrounding a portion of said lower section including the upper portion thereof, a plurality of spaced apart downcomers connecting the bottom of said upper section with the lower part of said intermediate boiler, a heating coil arranged in the bottom of said intermediate boiler and adapted to be connected to said source of supply of a heating medium, a discharge pipe connected to said intermediate boiler and having a discharge opening positioned below the top of said lower section, conduit means for supplying crude preheated material to said lower section whereby the liquid portion thereof will fall towards the bottom boiler and the gaseous product will rise in said tower, and conduit means connected to the top of said tower for the egress therethrough of material from said tower.

2. In an acetone rectifying tower, a bottom boiler having an upper end, a heating coil positioned in said bottom boiler and adapted to be connected to a source of supply of steam, a discharge pipe connecting with said boiler and providing a leveling device, determining a liquid level in said bottom boiler below said upper end, said tower further including a lower bubble section connected to said upper end and an upper bubble section, said upper and lower sections being spaced apart and being arranged in superimposed relation with respect to each other, an intermediate boiler extending between said upper and lower sections and surrounding a portion of said lower section including the upper portion thereof, a plurality of spaced apart downcomers connecting the bottom of said upper section with the lower part of said intermediate boiler, a heating coil arranged in the bottom of said intermediate boiler and adapted to be connected to said source of supply of steam, a discharge pipe connected to said intermediate portion and having a discharge opening positioned below the top of said lower section, conduit means for supplying crude preheated acetone to said lower section whereby the liquid portion thereof will fall towards the bottom boiler and the gaseous products will rise in said tower, and conduit means connected to the top of said tower for the egress therethrough of material from said tower.

3. In an acetone rectifying tower, a bottom boiler having an upper end, a heating coil positioned in said bottom boiler and adapted to be connected to a source of supply of steam, a discharge pipe connecting with said boiler and providing a leveling device determining a liquid level in said bottom boiler below said upper end, said tower further including a lower bubble section connected to said upper end and an upper bubble section, said upper and lower sections being spaced apart and being arranged in superimposed relation with respect to each other, an intermediate boiler extending between said upper and lower sections and surrounding a portion of said lower section including the upper portion thereof, a plurality of spaced apart downcomers connecting the bottom of said upper section with the lower part of said intermediate boiler, a heating coil arranged in the bottom of said intermediate boiler and adapted to be connected to said source of supply of steam, a discharge pipe connected to said intermediate portion and having a discharge opening positioned below the top of said lower section, conduit means for supplying crude preheated acetone to said lower section whereby the liquid portion thereof will fall towards the bottom boiler and the gaseous products will rise in said tower, and conduit means connected to the top of said tower for the egress therethrough of material from said tower, a first conduit connected to said lower section for supplying treating material thereto, and a second conduit connected to said upper section for supplying a separate treating material to the upper section of the tower.

4. In an acetone rectifying tower, a bottom boiler having an upper end, a heating coil positioned in said bottom boiler and adapted to be connected to a source of supply of steam, a discharge pipe connecting with said boiler and providing a leveling device determining a liquid level in said bottom boiler below said upper end, said tower further including a lower bubble section connected to said upper end and an upper bubble section, said upper and lower sections being spaced apart and being arranged in superimposed relation with respect to each other, an intermediate boiler extending between said upper and lower sections and surrounding a portion of said lower section including the upper portion thereof, a plurality of spaced apart downcomers connecting the bottom of said upper section with the lower part of said intermediate boiler, a heating coil arranged in the bottom of said intermediate boiler and adapted to be connected to said source of supply of steam, a discharge pipe connected to said intermediate portion and having a discharge opening positioned below the top of said lower section, conduit means for supplying crude preheated acetone to said lower section whereby the liquid portion thereof will fall towards the bottom boiler and the gaseous product will rise in said tower, and conduit means connected to the top of said tower for the egress therethrough of material from said tower, a first conduit connected to said lower section for supplying alkaline treating material thereto, and a second conduit connected to said upper section for supplying acidic treating material to the upper section of the tower.

5. A rectifying tower for rectifying crude gaseous acetone and other fluids, comprising a bottom boiler having a top, an intermediate boiler having a bottom and a top, heating means for said bottom boiler and said intermediate boiler, a lower section of trays and an upper section of trays, said lower section of trays having a lower end and an upper end portion, said lower end being connected to said top of said bottom boiler, said upper end portion entering said intermediate boiler through said bottom end and ending in said intermediate boiler adjacent said top of said intermediate boiler, said upper section of trays having a bottom section and an upper end, said bottom section being connected to said top of said intermediate boiler and said upper end forming a discharge opening of said tower, at least one downcomer connecting said bottom section with said intermediate boiler adjacent said bottom of said intermediate boiler, a discharge pipe connected to said bottom of said intermediate boiler and having a discharge opening located below said upper end portion of said lower section of trays and above said bottom of said intermediate boiler, and means for supplying treating materials to said upper and lower sections of trays.

6. A rectifying tower for rectifying crude gaseous acetone and other fluids, comprising a bottom boiler having a top, an intermediate boiler having a bottom and a top, steam coils for heating said boilers, means for supplying steam to said coils, at least one control valve for each of said coils, a lower section of trays and an upper section of trays, said lower section of trays having a lower end and an upper end portion, said lower end being connected to said top of said bottom boiler, said upper end portion entering said intermediate boiler through said bottom and ending in said intermediate boiler adjacent said top of said intermediate boiler, said upper section of trays having a bottom section and an upper end, said bottom section being connected to said top of said intermediate boiler, said upper end forming a discharge opening of said tower, at least one downcomer connecting said bottom section with said intermediate boiler adjacent said bottom of said intermediate boiler, a discharge pipe connected to the bottom of said intermediate boiler and having a discharge opening located below said upper end portion of said lower section of trays and above said bottom of said intermediate boiler, and means for supplying treating materials to said upper and lower sections of trays.

(References on following page)

References Cited in the file of this patent

UNITED STATES PATENTS

| | | |
|---|---|---|
| 1,069,829 | Thoens et al. | Aug. 12, 1913 |
| 1,418,885 | Schulze | June 6, 1922 |
| 1,831,887 | Sieck | Nov. 17, 1931 |
| 1,837,834 | Peters | Dec. 22, 1931 |
| 1,926,116 | Sheldon | Sept. 12, 1933 |
| 1,947,577 | Bahlke et al. | Feb. 20, 1934 |
| 1,986,431 | Gray | Jan. 1, 1935 |
| 2,107,265 | Archibald | Feb. 8, 1938 |
| 2,238,016 | Downey | Apr. 8, 1941 |
| 2,389,172 | Van der Hoeven et al. | Nov. 20, 1945 |
| 2,415,411 | Bowman | Feb. 11, 1947 |
| 2,465,717 | Engel | Mar. 29, 1949 |
| 2,477,595 | Goldsbarry | Aug. 2, 1949 |
| 2,485,329 | Steele et al. | Oct. 18, 1949 |